May 6, 1969    F. J. HEAP ET AL    3,442,175
MULTIPLE AXIS MILLING APPARATUS
Filed May 3, 1966    Sheet 1 of 3

INVENTORS
FORREST J. HEAP
RICHARD A. MYERS
BY Edwin Coates
—ATTORNEY—

May 6, 1969 F. J. HEAP ET AL 3,442,175
MULTIPLE AXIS MILLING APPARATUS
Filed May 3, 1966 Sheet 2 of 3

INVENTORS
FORREST J. HEAP
RICHARD A. MYERS
BY
J. Edwin Coates
-ATTORNEY-

May 6, 1969      F. J. HEAP ET AL      3,442,175
MULTIPLE AXIS MILLING APPARATUS
Filed May 3, 1966      Sheet 3 of 3
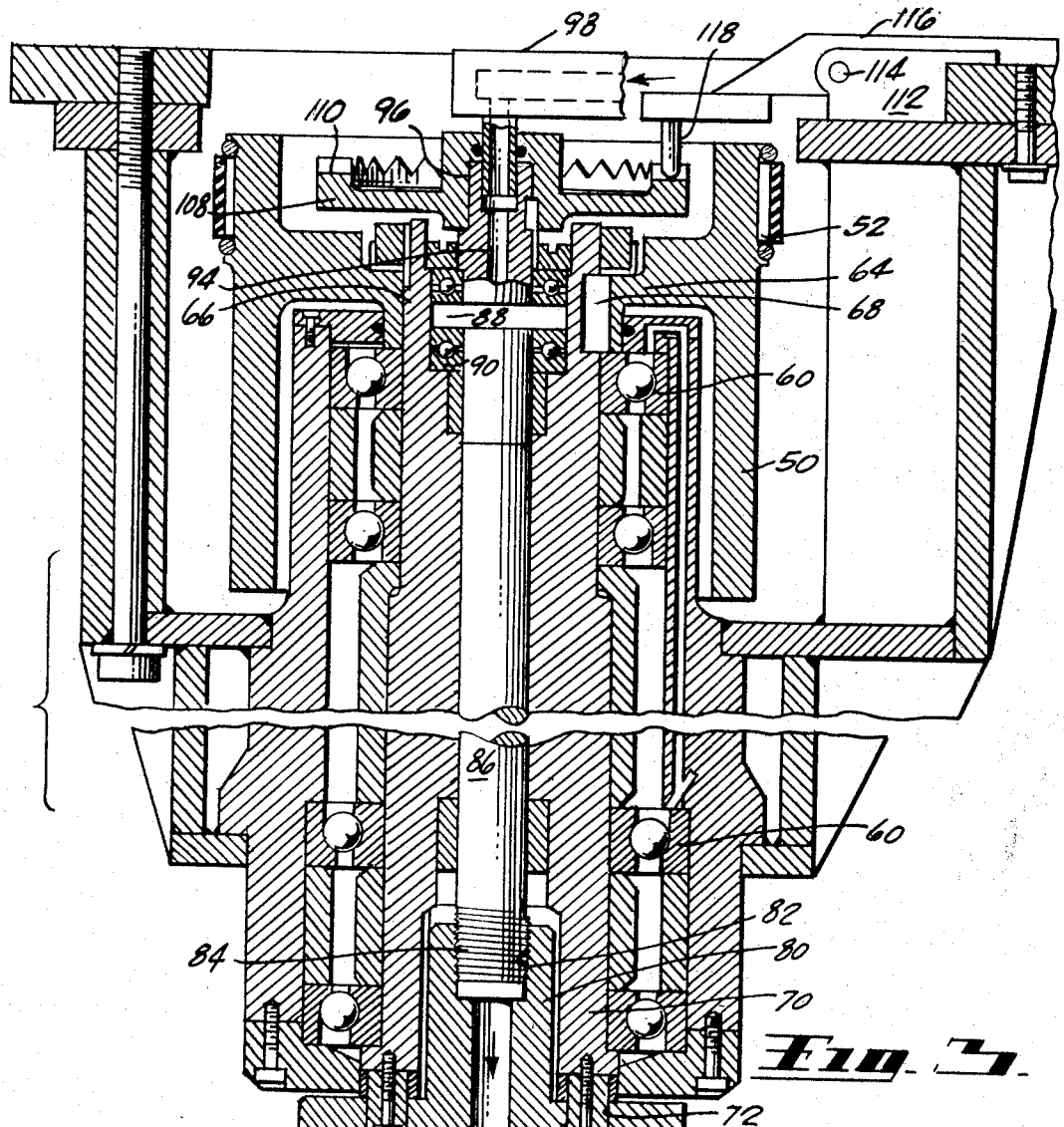
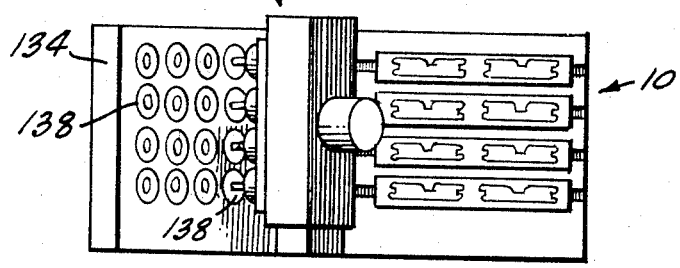
INVENTORS
FORREST J. HEAP
RICHARD A. MYERS
BY J. Edwin Coates
— ATTORNEY.

United States Patent Office 3,442,175
Patented May 6, 1969

3,442,175
MULTIPLE AXIS MILLING APPARATUS
Forrest J. Heap, Huntington Beach, and Richard A. Myers, Rolling Hills Estates, Calif., assignors, by mesne assignments, to McDonnell Douglas Corporation, Santa Monica, Calif., a corporation of Maryland
Filed May 3, 1966, Ser. No. 547,238
Int. Cl. B23c 1/00, 3/00, 7/00
U.S. Cl. 90—15                    13 Claims

ABSTRACT OF THE DISCLOSURE

Mill head of apparatus is vertically extending box-like housing having central drive spindle and preferably two or more driven spindles above and below it, all extending horizontally toward workpieces. Elongate hollow pulley on each spindle serves as flywheel to eliminate tool chatter. Separate flexible belt drive from drive spindle to each driven spindle is quiet and also eliminates tool chatter. At least one pulley smaller than at least one other to inhibit resonance. Automatic tool changer has means to restain draw bolt while spindle rotates to connect and disconnect tools with no hand operation.

---

This invention lies in the field of milling machines of the type generally referred to as multiple axis, and it is directed particularly to apparatus for greatly increasing the productive capacity of a multiple axis machine of the type presently used in industry without a corresponding increase in complexity, cost or floor space requirements.

The present day multiple axis milling machine is used for producing simple and complex three dimensional contours in blanks or partially formed workpieces and is particularly suited for forming small quantities of parts which could be formed by high production methods, such as forging or stamping, but only at a much higher unit cost because of the high total cost of the tooling required. It is also very valuable for forming parts whose contours are too complicated for the high production methods.

The machine referred to utilizes a single spindle which carries a cutter at its forward free end by means of a collet, chuck, draw bolt, or the like. In addition to its axis of rotation for cutting, it has five other axes of movement. It is mounted for rectilinear bodily displacement vertically and horizontally in a vertical plane parallel to the general plane of the workpiece and horizontally normal to said plane toward and away from the workpiece. In addition, it is mounted for angular swinging in horizontal and vertical planes, so that the axis of the spindle may be set at any angle, making it as universal as a hand held tool. It is common practice to control a machine of this type by a multi-channel numerical control tape so that the entire operation of forming a part from a workpiece may be programmed in advance, and every part turned out by the machine will be identical in every respect.

A fixture is normally provided in the form of an upright frame carrying a work holding table which has a front face lying in a vertical plane parallel to the plane of the first two axes of bodily movement of the spindle mentioned above. The fixture, table, and workpiece are all stationary, and all movement is in the spindle mounting. While this type of machine is very satisfactory, it is limited to forming one workpiece at a time. Forming of two or more workpieces at one time requires complete duplication of the machine, which is both expensive and space consuming.

One proposal for increasing the capacity of a single machine has been to copy the principle of multiple spindle drills which are in common use. Several workpieces would be mounted on the work holding table in vertically spaced relation. A special vertically enlarged mill head would be provided with a cutter for each workpiece. However, this arrangement turned out to be unworkable because when the mill head tilts in a vertical plane the spindles above and below the tilt axis will move in opposite directions toward and away from their respective workpieces and thus cannot perform identical cutting operations.

The difficulties described above are overcome by the novel apparatus incorporating the invention disclosed and claimed in the copending application of Claire E. Barnes et al., Ser. No. 522,079, filed Jan. 21, 1966, now Patent No. 3,371,580. Briefly, that application discloses an apparatus including a basic profile milling machine on which is mounted a vertically elongate mill head in the form of a housing in which are mounted a plurality of spindles in vertically spaced relation. The forward free ends of the spindles extend outward of the casing toward the fixture, and a cutting tool is mounted on each spindle. This mill head is movable on four of the five axes described above. It does not tilt vertically although it swings laterally.

The fixture includes an upright frame carrying a plurality of horizontally elongate work holding tables, one for each cutter. The tables are vertically spaced one above the other, with the same vertical spacing as the cutters, and they are mounted for pivoting on horizontal axes which lie in a vertical plane parallel to the first two axes of movement of the mill head. The work receiving faces of the tables in neutral position lie in a vertical plane parallel to the plane of their pivotal axes. The tables are operatively connected so that they all tilt in exactly the same way to provide in effect the fifth axis of movement for each of the cutters. The tilting of the work tables is controlled by the same tape channel which controls the fifth axis of a single spindle machine. Thus, each combination of spindle and associated table operates effectively in the same way as the single spindle machine, and the new machine multiplies production by the number of spindles while utilizing the same floor space and requiring only a relatively small amount of additional equipment.

The present disclosure is directed to the mill head which has been developed for use in the combination just described. The new mill head is designed to be mounted directly on the front wall of the single spindle head of the existing machine and to take its power therefrom. Thus, with a minimum of additional equipment, a multiple spindle, multiple axis milling machine is produced which uses both the power and the universal mounting of the original machine. Vertical tilt of the basic head is locked out so that only four of the original five axes of movement are available for the new head, the function of the fifth axis having been taken over by the fixture.

Generally stated, the new mill head, or milling attachment, comprises an elongate, rectangular box-like housing adapted to be mounted directly on the face or font wall of the single spindle head, with the longitudinal axis of the housing extending vertically. A drive spindle is located centrally in the housing for rotation about an axis perpendicular to the longitudinal axis of the housing so that the spindle axis is horizontal when the housing is mounted in place. The rear end of the drive spindle is formed to engage with the free end of the power spindle incorporated in the basic machine. In the presently preferred embodiment of the attachment there are four driven spindles in the housing, although more or fewer spindles may be incorporated depending on many different factors. These spindles are located two above and two below the drive spindle and are mounted for rotation about axes parallel to the axis of the drive spindle with their forward free ends extending outward of the housing toward the fixture and adapted to have milling cutters mounted thereon.

All of the spindles are provided with substantially identical pulley bodies which are cylindrical in form and of large diameter and quite elongate, being approximately half the length of the spindles. Their excess size and weight are designed to give them a very strong flywheel effect which reduces chatter of the cutter teeth and produces extremely smooth machined surfaces. Each driven pulley body is provided with a single pulley formation located at different axial distances from the rearward or aft ends of the bodies, and the drive pulley body is provided with a pulley formation for each driven pulley body, located successively along its length so that all of the pulley bodies and their respective spindles may be driven at the same time. The pulley formations are provided with drive teeth, and resilient timing belts preferably of elastomeric material and also provided with drive teeth are trained over corresponding drive and driven pulley formations. The use of these resilient belts eliminates the chatter and backlash which is inherent in the gear assemblies normally used for this purpose and also eliminates the need for lubrication.

The diameter of at least one pulley body, preferably a matched pair, is made different from at least one of the other pulley bodies so that there will be a difference of a few hundred revolutions per minute in the spindle speeds which has the effect of damping vibration and cutting tooth chatter.

Each driven spindle has a tool driving formation at its forward free end to engage a cutter body, and is provided with a draw bolt to lock the cutter on the spindle. Automatic, tape-controlled means is provided to cause the draw bolts to rotate with respect to their respective spindles so that a complete set of cutters can be automatically picked up and locked in place with no need for manual control. For very high speed cutting operations, the automatic tool changer operates in the same way to pick up complete and compact air motors carrying cutters at their forward ends. These air motors usually run at four or five times the speed of the spindles. When they are mounted in place they offer three different cutting speeds because the air motors runs at constant speed while the spindle may be held stationary or rotated forward or backward.

Various other advantages and features of novelty will become apparent as the description proceeds in conjunction with the accompanying drawings, in which:

FIGURE 3 is a sectional view through the housing taken on the axis of one of the driven spindles;

FIGURE 6 is an elevational view of the assembly of FIGURE 5.

Figure 1:
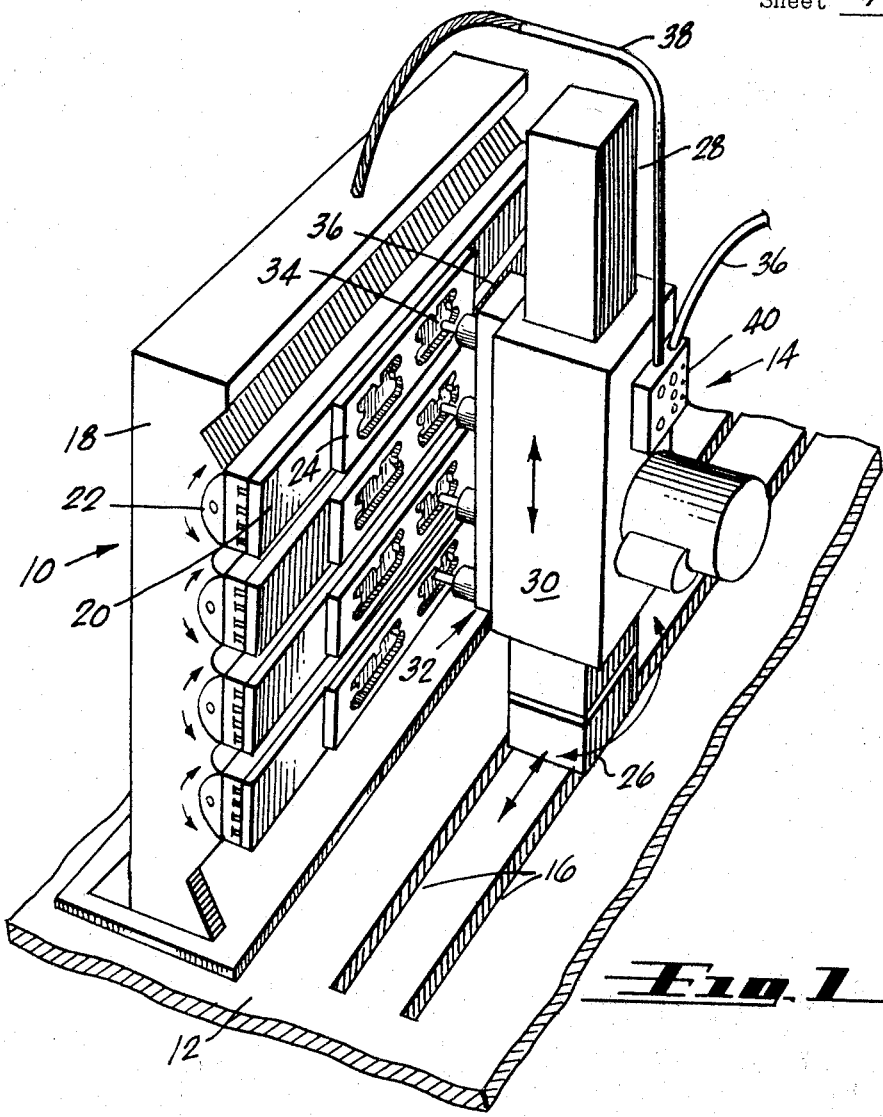
FIGURE 1 is a perspective view of a milling machine and its cooperating work holding fixture with a multiple spindle mill head.

The relation of the milling machine to the fixture is best shown in FIGURE 1, where it will be seen that fixture 10 is mounted in a fixed position on floor 12 while milling machine 14 is positioned in front of the fixture and movably mounted and guided on tracks 16 for movement parallel to the general front vertical plane of the fixture. The details of construction and operation of the fixture are set out in the copending application of Barnes et al., Ser. No. 522,079, now Patent No. 3,371,580, referred to above, and a brief description has been incorporated hereinabove. In brief, it comprises an upright elongate frame 18 standing in a generally vertical plane, and a plurality of horizontally elongate, horizontally extending work holding tables 20 mounted for rotation about horizontal pivots 22. In neutral position, as shown, the front faces of the tables lie in a vertical reference plane, and to these faces are mounted identical workpieces 24 which are to be profile milled into identical shapes. The work holding tables 20 tilt up and down to furnish the fifth axis of movement while the milling machine 14 provides the other four axes of movement.

The milling machine itself broadly comprises a base 26 mounted in tracks 16, a hollow column 28 mounted on the base for rotation about a vertical axis, a hollow carriage 30 mounted on the column for vertical bodily movement, and a mill head or milling attachment 32 carried by the carriage 30 for limited horizontal movement toward and away from the fixture. The milling cutters 34 are shown extending outward from the mill head toward the fixture to engage workpieces 24. It will be apparent that these elements will provide the four axes of movement mentioned previously. Base 26 directly provides horizontal movement parallel to the plane of the fixture. Movement of head 32 on carriage 30 provides horizontal bodily movement toward and away from the fixture, and rotation of column 28 on base 26 provides lateral twist.

Electrical power is supplied from a source not shown through conduit 36 to the interior of carriage 30. A completely programmed numerical tape controller is housed within carriage 30 and provides signals for all operations of the apparatus. The signals from one of the tape channels are transmitted through conduit 38 to the fixture 10 to control the tilting of tables 20. Channels are also provided on the tape to control the operation of the cutters and of the automatic tool changers. The tape mechanism is conventional in construction and does not form a novel element of the invention, and no detailed description is deemed necessary. Control box 40 contains switches for starting and stopping the total operation as well as for general manual control when desired or in the event of an emergency.

Figure 2:
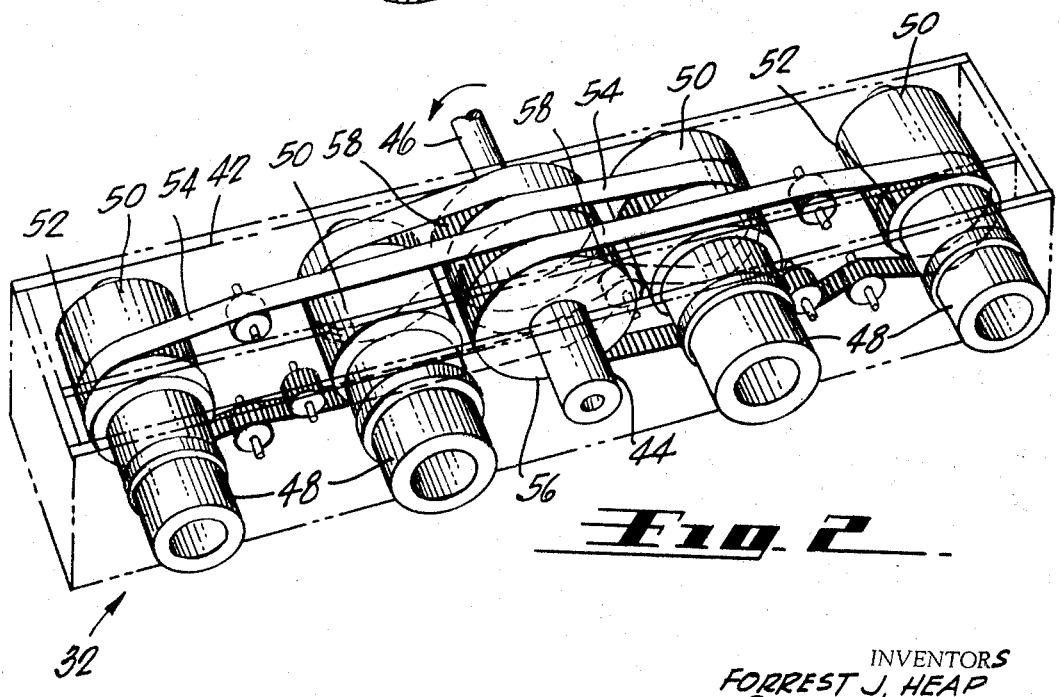
FIGURE 2 is a perspective view of the spindle and drive arrangement, with a portion of the housing shown in phantom lines.

The mill head or milling attachment 32, as best seen in FIGURE 2, comprises an elongate, rectangular boxlike housing 42 which is attached in a vertical position to the basic machine head mounted on carriage 30. In preferred form the drive spindle 44 is centrally located in housing 42 for rotation about a horizontal axis and has a positive drive connection to power shaft 46 of the basic machine head. Spaced between the drive spindle and the ends of the housing are a total of four driven spindles 48 two above the drive spindle and two below. Each driven spindle is mounted for rotation about an axis parallel to that of the drive spindle, and is provided with a pulley body 50 keyed to the spindle and carrying a pulley formation 52 adapted to be engaged by a resilient drive belt 54 such as an elastomeric timing belt.

Drive spindle 44 is provided with a pulley body 56 carrying four pulley formations 58, one for each of the driven pulley bodies. It will be noted that all four of the driven pulley bodies are equal in length and of the same length as the drive pulley body and of very nearly the same diameter, the rearward or aft ends all being in alignment along the aft wall of the housing. The pulley formation on each pulley body 50 is spaced a different distance axially from the aft end of the pulley body so that all four of the belts can be arranged in parallel and very closely spaced relation without any interference with each other. It will also be noted that the pulley formations are so arranged that the belt take off in opposite directions alternately from the drive pulley body to balance and equally distribute the lateral loads on the drive spindle and its bearings. Idler pulleys are appropriately arranged to maintain all of the belts at the proper tension.

It has been found that the use of elastomeric timing belts for the drives as just described has resulted in a major improvement in operation. The belts are much quieter than gearing and require no lubrication. Much more important is the fact that they practically eliminate backlash and cutting tooth chatter, resulting in smoother finishes. Another improvement consists in making at least one of the driven pulley bodies larger or smaller than at least one other pulley body to produce different spindle speeds which has been found to be very effective in damping vibrations which produce tool chatter. In practice, in the design shown, the upper and lower, or outer, driven pulley bodies have been made slightly smaller than the inner ones, so that the ratio of drive pulley to outer driven pulley is 1.2884 to 1 and the ratio of the drive pulley to the inner driven pulley is 1.2407 to 1. At the usual machine speed this produces a difference of approximately 200 r.p.m. which has been found to be very effective in reducing tool chatter.

A detailed illustration of one of the driven spindles and its attachments is presented in FIGURE 3, where it will be seen that spindle 48 is rotatably mounted in bearings 60 which in turn are carried by frame structure 62, which is part of housing 42. Pulley body 50 has a hub 64 which fits on the aft end 66 of the spindle and is keyed thereto by key 68 so that rotation of the pulley body will positively drive the spindle. At the forward free end 70 of the spindle a plurality of drive bosses 72 are mounted by screws 74 and are adapted to engage in sockets 76 in the rear wall of a cutter body 78 to positively drive it and its mounted cutter 34.

The cutter body has a rearwardly extending boss 80 which fits into end 70 of the spindle and has a threaded bore 82 to receive the threaded fore end 84 of draw bolt 86. The draw bolt is journaled in spindle 48 for rotation with and with respect to the spindle, the flange 88 on the draw bolt and the bearing assembly 90 in the aft end 66 of the spindle maintaining the draw bolt axially immovable in the spindle. As is known, relative rotation of the draw bolt in one direction will pull the cutter body 78 rearwardly and lock it in driving relation to the spindle, and relative rotation of the draw bolt in the opposite direction will release it.

Cutter body 78 is also provided with a lubricant passage 92 which opens forwardly in a position to deliver lubricant or coolant of any type to the point of contact of the cutter and the work piece. Draw bolt 86 is also provided with an axial passage 94 communicating with passage 92 at its forward end. At its aft end 96, the draw bolt has a sealed, rotatable connection with angle fitting 98 which in turn communicates with a source, not shown, of the desired type of lubricant which flows from the source through the draw bolt and the cutter body to the point of cutting contact.

Figure 4:
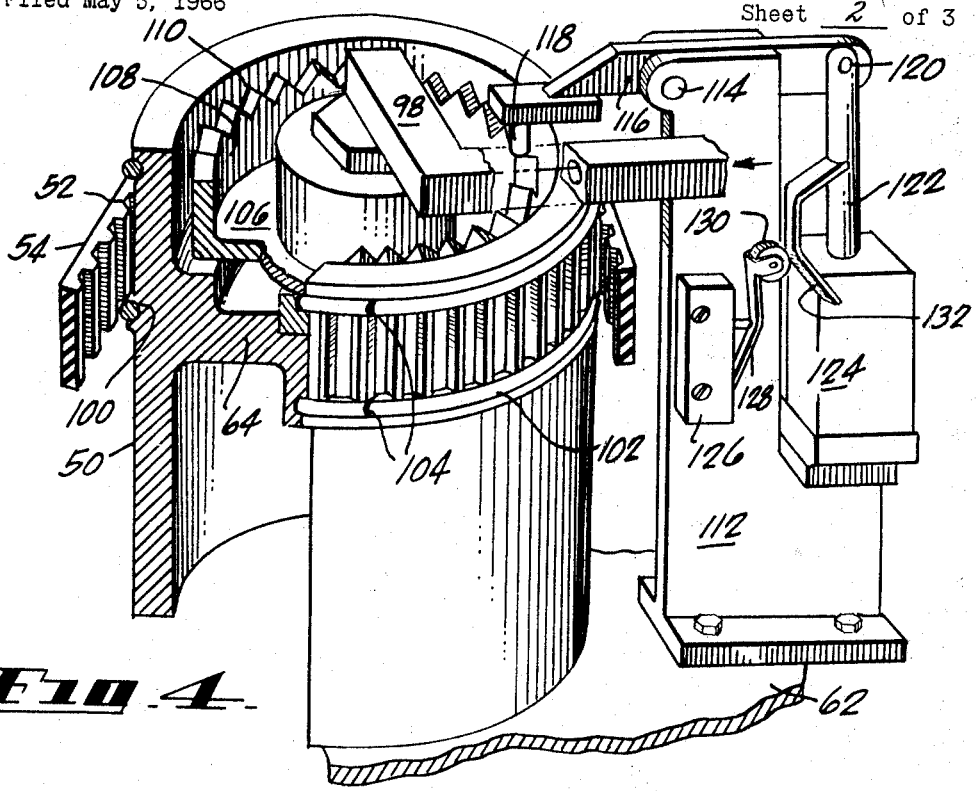
FIGURE 4 is a perspective view of one of the driven pulley bodies and the automatic tool changer control mechanism.

It will be noted in referring to FIGURES 3 and 4 that pulley body 50 is much larger than the minimum size necessary for the purpose. Its length is approximately half of the length of the spindle and its mass is considerably more than one half of the mass of the spindle. With this weight and its relatively large diameter it exerts a very pronounced flywheel effect when rotating at working speed. This gives a more constant torque, which further improves the finish of the cut.

Because of the manufacturing technique involved it is possible to use the same basic pulley body for all spindles. The body as originally cast and turned is left large enough in outside diameter from end to end for the formation of teeth to engage the drive belt. Considering the pulley of FIGURES 3 and 4, the diameter is reduced through about three-fourths of the length, and the remaining annular enlargement can be hobbed from end to end without interference to form the toothed section 52. A pair of annular grooves 100 are then formed at the ends of section 52 and lengths of wire 102 are wrapped tightly into the grooves and their ends brazed at 104 to make rings which are permanently located to serve as belt guides. The driven pulleys are all made the same way except that each has the annular enlargement at a different axial location. The drive pulley is made similarly except that the entire length is left full size and hobbed from end to end, and then grooves and rings are provided to divide it into four pulley formations.

Automatic tool changing is accomplished with the further apparatus shown in FIGURES 3 and 4. A disk-like member 106 is fixedly secured to the aft end 96 of the draw bolt 86. The disk has a rearwardly facing flange 108 serrated to present a series of teeth 110 whose faces may be at any suitable angle. Forty-five degrees has proven to be very satisfactory for the present purpose. These teeth serve as detent formations. A support 112 mounted on the housing structure has a pivotal support 114 at its aft end on which is fulcrumed a lever 116. The left end of the lever, as viewed in FIGURES 3 and 4, carries a detent member in the form of a pin 118 having a rounded free end to engage a detent formation on member 106.

The right end of lever 116 is pivoted at 120 to the free end of piston rod 122 which is actuated by cylinder 124. A micro-switch 126 is mounted on support 112 and has an actuating arm 128 with a roller 130 which lies in the path of cam 132, the latter being rigidly secured to piston rod 122. The cam is so formed and located that when detent pin 118 rises high enough to ride over the crest of a tooth 110 the cam will lower enough to contact roller 130 and actuate the micro-switch.

When it is desired to lock a cutter body 78 onto the free end 70 of a driven spindle, the cutter and spindle are brought together and into axial alignment with the bosses 72 of the spindle just slightly engaging sockets 76 in the cutter body and with end 84 of draw bolt 86 contracting the aft end of boss 80 on the cutter body. The spindles have first been slowed down to about 20 r.p.m. Air under pressure is now supplied to cylinder 124 which raises piston rod 122 and causes pin 118 to engage a trough between two teeth 110, halting rotation of disk 106 and the draw bolt. Since the latter is stationary and the spindle and cutter body continue to rotate, end 84 of the draw bolt threads itself into boss 80 until the cutter body is tightly locked on the free end of the spindle. At this point the disk 106 is forced to rotate, the adjacent tooth 110 contacting pin 118 and developing a sufficient axial component to overcome the resilient pressure of the air in cylinder 124, which has been set to yield to the force of tooth 110 when the torque on draw bolt 86 is high enough to insure that cutter body 78 is locked as tightly as necessary.

The tool pick-up and locking is all automatic, being initiated by the tape control mechanism at the appropriate time. When locking of a tool has been completed, disk 106 will rotate continuously and each tooth 110 will raise pin 118 and actuate the micro-switch to send a signal to the control mechanism. Of course, all four of the spindles are actuated at one time to pick up and lock on tools and all four of them will send signals when locking is complete. As soon as the control mechanism starts receiving signals from all four spindles it releases the air in all cylinders 124, and pins 118 move out of engagement with teeth 110. Thereafter the spindles are brought up to normal cutting speed.

To release the tools, approximately the reverse technique is employed. The spindles are rotated in the opposite direction at slow speed and air is applied to cylinders 124 to actuate pins 118. In this case the air pressure is higher to insure that the draw bolt will be stopped to break their threads loose from the tools. Also in this case no signals are produced when the tools are loosened and disconnected. Consequently a delay system is employed and the draw bolts are released after sufficient time has passed to insure that all of the tools have been disconnected.

Figure 5:
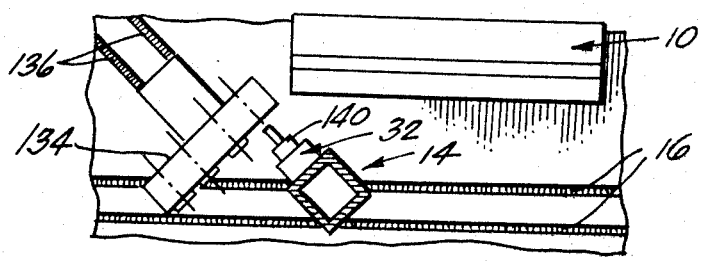
FIGURE 5 is a plan view of the milling machine and work holding fixture together with a tool storage rack.

The automatic system described above is used in conjunction with a tool storage rack to provide quick change of cutters without the necessity of manual handling of any tool or other items. As seen in FIGURES 5 and 6, in addition to the fixture 10 and milling machine 14 there is also provided a tool storage rack 134. The rack is movably mounted on tracks 136 and is programmed at appropriate times to move from an inoperative position at one side of the fixture to an operative position where it directly confronts the milling machine. The rack is provided with a plurality of vertically extending rows of tool pockets 138 sized and shaped to neatly receive tools not in use and hold them in positions which will be in axial alignment with the spindles at the proper time. Each row has a pocket for every spindle.

At certain stages of operation the control mechanism is programmed to change to different sizes or shapes of cutters or to pick up air motors equipped with cutters in order to do some machining at different speeds. At such stage rack 134 will move along tracks 136 to the position shown in FIGURES 5 and 6, and machine 14 will move along its tracks to the position shown and then twist so that it is in alignment with an empty row of tool pockets. The rack and the mill head are then brought close enough together for the tools to fit into the empty pockets. They are then released and deposited. The rack and mill head are now separated slightly and adjusted laterally so that the spindles are aligned with a different set of cutters or a set of air motors with cutters. They are then brought together and the new tools are picked up and locked as described above. Rack 134 may have as many rows of pockets as necessary for the work to be done.

For particular types of work it is necessary or desirable to operate cutting tools at a much higher speed than the normal speed of the basic machine. This problem is easily handled by the present apparatur. One or more rows of pockets 138 are supplied with air motors 140 equipped with their own cutters. While these air motors are somwhat larger than the plain cutter bodies they are formed with aft ends which are identical with those of the cutter bodies. Hence member 78 in FIGURE 3 is representative of an air motor 140 as well as a mere cutter body. The same passage 92 is provided but in this case it is to transmit a supply of air for the motor. The same fitting 98 and passage 94 in draw bolt 86 are used to supply pressurized air for operation of the motor.

In a typical installation presently in use the normal spindle speed of the multiple spindles is about 4400 r.p.m. The speed of the air motor is about 18,000 r.p.m. Thus it will be seen that when the air motor is added the tool speed is increased several fold. The combination gives a wide range of tool speeds because the spindle may be held stationary or rotated in either direction up to its maximum speed. Thus, with this particular combination and the air motor speed being constant, the tool speed ranges from a low of 13,600 r.p.m. to a high of 22,400 r.p.m. or a spread of 8800 r.p.m.

It will be apparent to those skilled in the art that various changes may be made in the construction and arrangement of parts as disclosed without departing from the spirit of the invention, and it is intended that all such changes shall be embraced within the scope of the following claims.

We claim:

1. A multiple spindle milling attachment for use on a profile milling machine, comprising: an elongate housing; a drive spindle mounted in said housing intermediate the ends thereof for rotation about an axis perpendicular to the longitudinal axis of said housing; a plurality of driven spindles between said drive spindle and each end of said housing and all mounted for rotation about axes parallel to the axis of rotation of said drive spindle; said drive spindle having means for connection to a source of rotary driving power; each driven spindle having means for driving connection to a cutter; a pulley body on the drive spindle and on each driven spindle; a pulley formation on each driven pulley body; a plurality of pulley formations on the drive pulley body, one for each of the driven pulley bodies; and a separate, flexible drive belt engaging the pulley formation on each driven pulley body and the corresponding one of the pulley formations on the drive pulley body to produce a flexible, quiet drive connection between the drive spindle and all of the driven spindles.

2. An attachment as claimed in claim 1; the forward extremities of each of said driven spindles lying in a common plane parallel to the longitudinal axis of said housing and the rearward extremities of each of said driven spindles lying in another common plane parallel to the longitudinal axis of said housing; all of said pulley bodies being of substantially the same size and shape and each comprising a hollow elongate cylinder surrounding the rearward portion of its respective spindle and fixed thereto for rotation in unison to serve as a flywheel to damp cutter vibration; the pulley formation on each driven pulley body being located at a different axial distance from the rearward extremity of its respective pulley body to provide lateral alignment of all driven pulley formations with their corresponding drive pulley formations at the same time.

3. An attachment as claimed in claim 1; the axial locations of the various driven pulley formations being so chosen that the drive belts extend successively in opposite lateral directions from the drive pulley body to balance and evenly distribute lateral loads on the drive spindle and its bearings.

4. An attachment as claimed in claim 1; the diameters of the pulley formations being so chosen that at least one driven spindle will rotate at a speed different from the rotational speed of at least one other driven spindle to provide a frequency gap tending to damp vibration of all of the cutters.

5. An attachment as claimed in claim 1; each driven spindle being provided with a draw bolt normally rotatable therewith to retain a cutter locked on the forward end of the spindle, and rotatable with respect to its spindle to lock or unlock the cutter; and means in said housing actuatable to simultaneously restrain all of said draw bolts against rotation while said spindles continue rotation to provide the relative rotation which selectively locks or unlocks the cutter.

6. A multiple spindle milling attachment for use on a profile milling machine, comprising: a housing; a drive spindle and a plurality of driven spindles mounted in said housing for rotation about axes parallel to each other; said drive spindle having means for connection to a source of rotary driving power; each driven spindle having a free end extending outside the housing and having means in a common plane for driving connection to a cutter; a pulley body on the drive spindle and on each driven spindle; all of said pulley bodies being of substantially the same size and shape and each comprising a hollow elongate cylinder surrounding the rearward portion of its respective spindle and fixed thereto for rotation in unison to serve as a flywheel to damp cutter vibration; the rearward extremities of all of said pulley bodies lying in a common plane normal to their axes; a pulley formation on each driven pulley body; a plurality of pulley formations on the drive pulley body, one for each of the driven pulley bodies; the pulley formation on each driven pulley body being located at a different axial distance from the rearward extremity of its respective pulley body to provide lateral alignment of all driven pulley formations with their corresponding drive pulley formations at the same time; and a separate, flexible drive belt engaging the pulley formation on each driven pulley body and the corresponding one of the pulley formations on the drive pulley body.

7. Multiple spindle profile milling apparatus, comprising: a multiple position work holding fixture including a supporting frame mounted in fixed position and a plurality of work holding tables mounted one above the other with their work receiving front faces in a common vertical plane; a multiple spindle milling machine including a base and a milling head movable with and with respect to said base; said milling head comprising a housing; a drive spindle and a plurality of driven spindles mounted in said housing for rotation about horizontal axes extending toward said fixture with one driven spindle for each work holding table; drive means connecting said drive spindle to all of said driven spindles to rotate them simultaneously; each driven spindle having a free end extending out of said housing and into confronting relation with a workpiece mounted on the corresponding work holding table; the free end of each driven spindle having means for controllable driving connection with a cutter; means carried by said milling machine to cause simultaneous engagement and disengagement of said driving connections with said cutters; a cutter rack located adjacent to said fixture and having a vertical front wall; a plurality of vertical rows of pockets in said wall, each pocket being adapted to releasably hold a cutter, and each vertical row including a pocket for each work holding table; said milling machine being movably mounted to traverse the extent of the work holding tables and to move into confronting relation with said rack with its cutters extending into one row of pockets; said driving connections being simultaneously disengageable to deposit the cutters in said pockets; the machine being further positionable to bring the free ends of its spindles into contact with a set of cutters in another row; said driving connections being simultaneously engageable to pick up said new set of cutters for subsequent milling operations.

8. Profile milling apparatus comprising: a housing; at least one elongate, hollow spindle rotatably mounted in said housing and having a free end extending outward of said housing; means to rotatably drive said spindle; the free end of said spindle being formed to receive a cutter body and provided with means to engage said body to cause rotation of said cutter with said spindle; a draw bolt located within said spindle and axially immovable, and rotatable with and with respect to said spindle; the forward end of the draw bolt being located adjacent said free end and threaded for engagement with the cutter body to draw it tightly into fixed position on said free end; and automatic means to temporarily prevent rotation of said draw bolt while said spindle and cutter body are rotating to cause said draw bolt to be threaded into said cutter body to lock it in position while the spindle and cutter continue to rotate.

9. Apparatus as claimed in claim 8; said means to temporarily prevent rotation comprising a member fixed to said draw bolt for rotation therewith and provided with at least one detent formation; a detent member movable into and out of engagement with said formation; and means to resiliently urge said detent member into such engagement; said urging means exerting substantial resistance to rotation of said draw bolt but being yieldable to the rotating force applied to said draw bolt when the cutter has become firmly locked in operating position.

10. Apparatus as claimed in claim 9; said member fixed to the draw bolt comprising an annular plate having a margin provided with teeth around its periphery; said teeth having angular edges; said detent member being a pin axially movable into position in a trough between adjacent teeth; the resilient axial force on said pin being overcome by the axial force component of the adjacent tooth forced to rotate by locking of said cutter on said spindle.

11. Apparatus as claimed in claim 8; there being a plurality of spindles, draw bolts, and rotation-preventing means; and means operatively connected to all of said rotation-preventing means to actuate them simultaneously.

12. Profile milling apparatus comprising: a housing; an elongate, hollow spindle rotatably mounted in said housing and having a free end extending outward of said housing; means to rotatably drive said spindle; the free end of said spindle being formed to receive a cutter body and provided with means to engage said body to cause rotation of said cutter with said spindle; a draw bolt located within said spindle and axially immovable, and rotatable with and with respect to said spindle; the forward end of the draw bolt being located adjacent said free end and threaded for engagement with the cutter body to draw it tightly into fixed position on said free end; and a cutter body mounted on said free end and having a lubrication passage extending in an axial direction therethrough and terminating adjacent the cutter; said draw bolt having an axially extending passage therethrough communicating with the lubrication passage in the cutter body; and means to supply lubricant under pressure to the aft end of said draw bolt to pass therethrough and through the cutter body to lubricate the cutter.

13. Profile milling apparatus comprising: a housing; an elongate, hollow spindle rotatably mounted in said housing and having a free end extending outward of said housing; means to rotatably drive said spindle; the free end of said spindle being formed to receive an air motor body and provided with means to engage said body to cause rotation of said air motor with said spindle; a draw bolt located within said spindle and axially immovable, and rotatable with and with respect to said spindle; the forward end of the draw bolt being located adjacent said free end and threaded for engagement with the air motor body to draw it tightly into fixed position on said free end; and an air motor body mounted on said free end and having an air passage extending in an axial direction and terminating at the motor to supply driving air thereto; said air motor carrying a cutter at its outer free end; said draw bolt having an axially extending passage therethrough communicating with the air passage in said air motor; and means to supply air under pressure to the aft end of said draw bolt to pass therethrough and through the air motor body to drive the air motor and cutter; said air motor being rotatable in one direction and said spindle being rotatable in opposite directions to cause rotation of the cutter at different speeds.

References Cited

UNITED STATES PATENTS

| | | | |
|---|---|---|---|
| 3,371,580 | 3/1968 | Barnes et al. | 90—11 |
| 3,288,182 | 11/1966 | Jameson | 77—22 X |
| 3,286,595 | 11/1966 | Wollenhaupt | 77—22 X |
| 3,262,369 | 7/1966 | Pictrowski | 90—11.1 |
| 3,254,567 | 6/1966 | Daugherty | 90—11.1 |
| 3,114,294 | 12/1963 | Wright | 90—15 |
| 3,028,770 | 4/1962 | Pittwood | 77—4 |
| 2,977,827 | 4/1961 | Wenz | 77—55.3 |
| 2,885,930 | 5/1959 | Adams | 90—11.1 |
| 2,835,172 | 5/1958 | Barker et al. | 90—15 |
| 2,492,391 | 12/1949 | Minek et al. | 77—22 X |
| 2,379,405 | 7/1945 | Armitage | 90—15 |

FOREIGN PATENTS 669,127  2/1937  Germany.

ANDREW R. JUHASZ, Primary Examiner.

G. WEIDENFELD, Assistant Examiner.

U.S. Cl. X.R.

29—26, 568; 74—722; 77—3; 90—11